W. J. NEWTON.
FLUSH RECEPTACLE.
APPLICATION FILED JUNE 26, 1909.

988,018.

Patented Mar. 28, 1911.

Witnesses:

Inventor
William J. Newton
By his Attorneys
Rosenbaum Stockbridge

UNITED STATES PATENT OFFICE.

WILLIAM J. NEWTON, OF LYNBROOK, NEW YORK, ASSIGNOR TO METROPOLITAN SWITCHBOARD COMPANY, A CORPORATION OF NEW JERSEY.

FLUSH-RECEPTACLE.

938,018.

Specification of Letters Patent. Patented Mar. 28, 1911.

Application filed June 26, 1909. Serial No. 504,428.

*To all whom it may concern:*

Be it known that I, WILLIAM J. NEWTON, a citizen of the United States, residing at Lynbrook, in the county of Nassau and State of New York, have invented certain new and useful Improvements in Flush-Receptacles, of which the following is a full, clear, and exact description.

This invention relates to electrical appliances for either controlling an electrical circuit or providing an extension therefrom to any given point of current consumption.

More particularly my invention consists in a device adapted to be inserted in the box or casing of a wall switch in lieu of the usual switch mechanism and adapted to provide a flush receptacle from which a branch or extension cord or circuit may be run to any convenient point.

In my prior Patent No. 917,348, issued April 6, 1909, I have set forth a two-button wall switch of such construction that the entire switch mechanism may be freely slipped into or slipped out of a containing box or casing without disturbing any circuit wire or connection, the switch mechanism being mechanically supported, and all the electrical connections established by spring blades or strips which engage with one another when the switch mechanism is inserted in the box or casing. The present invention employs an arrangement of this same general type, and for purposes of illustration I have shown a box or casing similar to that of my patent referred to, and which, as above stated, is adapted to receive an ordinary two-button switch mechanism (not shown in the present case) which can be slipped or slid freely into and out of said box. By the present invention I provide a device adapted to be slipped or slid into such box or casing in lieu of the said switch mechanism, and which is thereupon adapted to constitute a plug box or flush receptacle, and furthermore, without requiring any change in the usual cover plate employed with the switch box the original cover being merely re-assembled in place after the above exchange has been completed.

With this object in view my invention consists in the features of construction and combination as hereinafter set forth and claimed.

Figure 1:
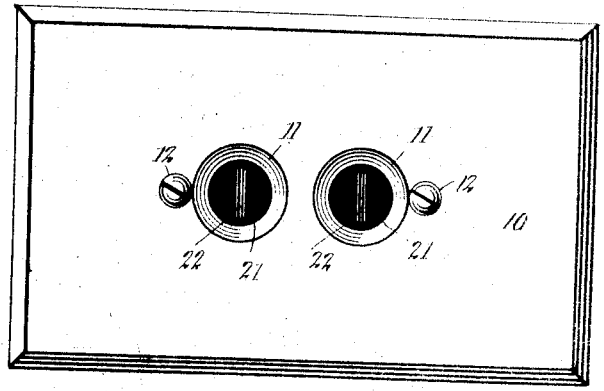
Figure 4:
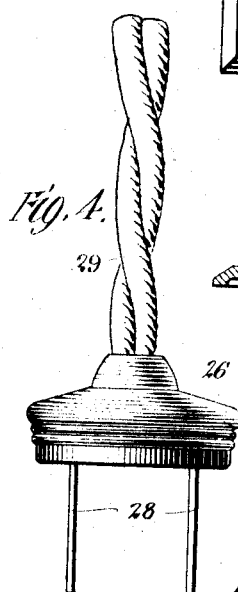
Figure 2:
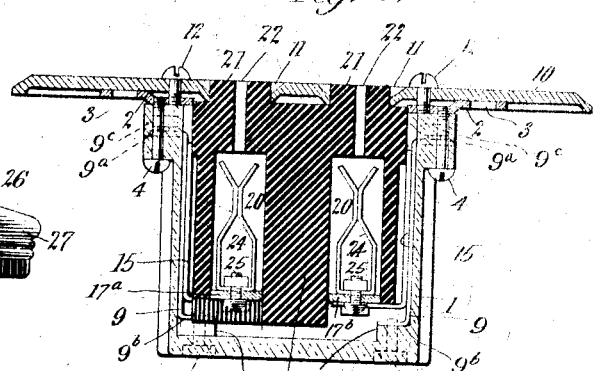
Figure 3:
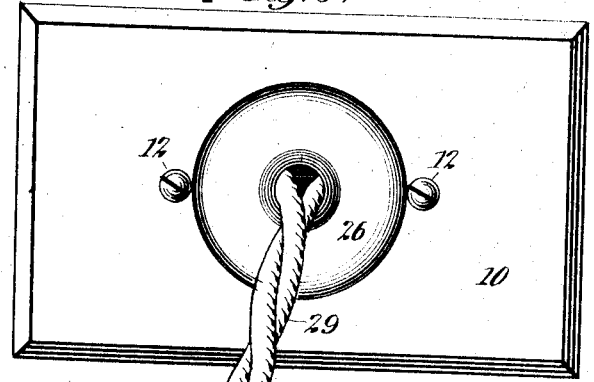
Figure 5:
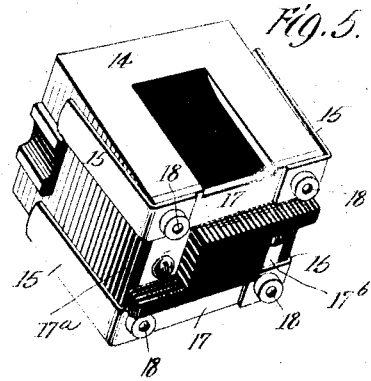

In the drawings: Figure 1 is a front or face view of a flush receptacle embodying the principles of my invention. Fig. 2 is a vertical sectional view of the same. Fig. 3 is a view similar to Fig. 1, with the branch or extension plug in place. Fig. 4 is a side elevation of the branch or extension plug. Fig. 5 is a perspective view showing a device which is inserted in the switch box or casing in lieu of the switch mechanism to change the same from a wall switch to a flush receptacle.

Referring to the drawings in which like parts are designated by the same reference sign, 1 indicates a box or casing in which the switch mechanism is adapted to be contained and which is received in a wall of a building or other desired location. As stated in my patent, I prefer to construct the box 1 of porcelain or insulating material throughout, and of rectangular outline with a pair of clips or lugs 2 projecting laterally from the edge of its open side and having holes 3 to receive any ordinary screw or other fastening device. The clips 2 may be conveniently stamped from sheet metal and secured to the retaining box 1 by screws or rivets 4. The interior of the box 1 is of substantially rectangular outline throughout, and near the four corners I provide metallic strips 9 bent right angularly in opposite directions at their respective ends, thereby forming the ears or lugs 9ª and 9ᵇ. The ears 9ᵇ rest against the bottom of the retaining box or against a ledge 1ª near the bottom thereof in which relation they are secured by the screws 9ˣ which pass upward through the bottom of the box. The outer ears 9ª have ordinary terminal screws 9ᶜ which are projected into and are accessible through notches at the upper side edges of the box. The usual permanent circuit wires or connections of the building are therefore conveniently adapted to be led to these terminal screws and permanently fastened in engagement therewith. It is of course obvious that the two wires of the supply circuit will be connected on one side of the box and the two wires of the controlled circuit connected on the other side of the box. Under these circumstances the box is adapted to receive the switch mechanism set forth in my patent above referred to or any other switch mechanism of the same class without any additional circuit connections, all of the latter being made by the insertion of the switch mechanism in the box.

10 denotes the usual cover plate which has openings 11 through which the usual operating buttons of the switch mechanism protrude.

12 indicate screws by which the cover plate is attached to the clips 2.

14 designates a block which may be made of hard rubber, porcelain, fiber or any insulating material or composition and of generally rectangular outline corresponding to the shape of the interior of the box 1.

15 are spring blades fixed to the four corners of one end or face of the block 14 and bent so that their main portions extend parallel with one another along two opposite side faces of the block. In this relation these spring blades are adapted to contact with the strips 9 which, as stated, are located at the four interior corners of the box 1. It is evident that a good mechanical support of the block and a good electrical connection between said strips and the spring blades is established in this simple way. The spring blades are connected together in pairs corresponding to the connections which would be established by the switch blades of the switch mechanism, and this may be done in any desired way. I prefer, however, to make use of the structure shown and which includes two small L-shaped plates 17 which fit into comparatively deep recesses of corresponding outline at the lower end face of the block 14. In this relation these plates are secured by bolts 18 which pass through the block 14 and additionally serve as securing devices for the spring blades 15, the latter being thereby clamped against the plate 17 as clearly shown in Fig. 5. The spring blades are therefore connected together in diametrically opposite pairs and at the same time the two extensions 17$^a$ and 17$^b$ of the respective plates 17 are brought into vertical alinement with the two axes on which the usual operating buttons of the switch mechanism are located.

20 denotes cavities within the block 14 and respectively centered on the two axes just above referred to.

21 denotes protuberances of the block 14 also centered with respect to the before-mentioned axes and of cylindrical outline generally corresponding in form and position to the buttons of the switch mechanism.

22 denote channels or passages extending through the protuberances 21 and into the cavities 20. These channels 22 are best made of flat or rectangular transverse section as shown in Fig. 1.

Within the cavities 20 I provide spring tongues 24 formed of spring metal strips bent into the U-shaped outline shown and secured to the portions 17$^a$ and 17$^b$ of the plates 17 by small bolts 25. It will be readily seen from the foregoing that the spring tongues 24 constitute the two poles of the supply circuit when the block is in place in the box or casing 1, and this regardless of which way around said block is inserted in said box.

26 denotes a plug formed with an ornamental or other base 27 and two metallic projecting prongs 28 which are connected within the plug to cord or extension wires 29. The form and location of the prongs 28 are such that they enter the channels 22 of the block 14 and pass between the extremities of the spring tongues 20 which are separated to make a good sliding electrical connection.

The change from a switch mechanism to a plug receptacle can be made at any time whenever desired, it being merely necessary to unscrew the cover plate and then slip the appropriate devices respectively out of and into place.

In initially furnishing a building with electric fixtures the present invention is particularly convenient, since the boxes 1 are permanently fitted into the wall in all cases and at all points throughout the structure, and the adaptation may be made after the completion of the building for wall switches or flush receptacles to supply any particular purpose. It will be particularly observed that although the same cover plate is employed in either case, still the appearance is not less ornamental with the flush receptacle than with the wall switch, or vice versa. There is therefore no reason for prejudice on the part of any one to either adaptation being considered as a permanent fixture in the installation; or in other words, the pre-designed and exclusive manner of use.

What I claim, is:—

1. The combination of a wall switch box having a casing, conductive members therein and a cover therefor, with a block having conductive members adapted to make electrical connection with the conductive members in the box when the block is inserted thereinto, the cover aforesaid having two spaced apertures therein arranged in predetermined positions corresponding to the spaced operating buttons with which such switches are usually equipped, and the block having channels therein leading toward the said apertures when the block and cover are in assembled relationship, said block also having within its interior contact making elements accessible from the outside of the box, through said apertures and channels, said contact making elements being in electrical connection with the conductive members aforesaid.

2. A device adapted to be inserted in the box or casing of a wall switch in lieu of the usual switch mechanism and comprising a block having exterior spring blades adapted to establish electrical connections within the box, said block also having spring tongues within its interior and having protuberances with channels extending toward said tongues and located to correspond to the usual operating buttons of said switch mechanism.

In witness whereof, I subscribe my signature, in the presence of two witnesses.

WILLIAM J. NEWTON.

Witnesses:
   WALDO M. CHAPIN,
   WILLIAM C. LARY.